No. 689,096. Patented Dec. 17, 1901.
T. B. KINRAIDE.
ELECTRICAL APPARATUS.
(Application filed May 4, 1901.)
(No Model.)
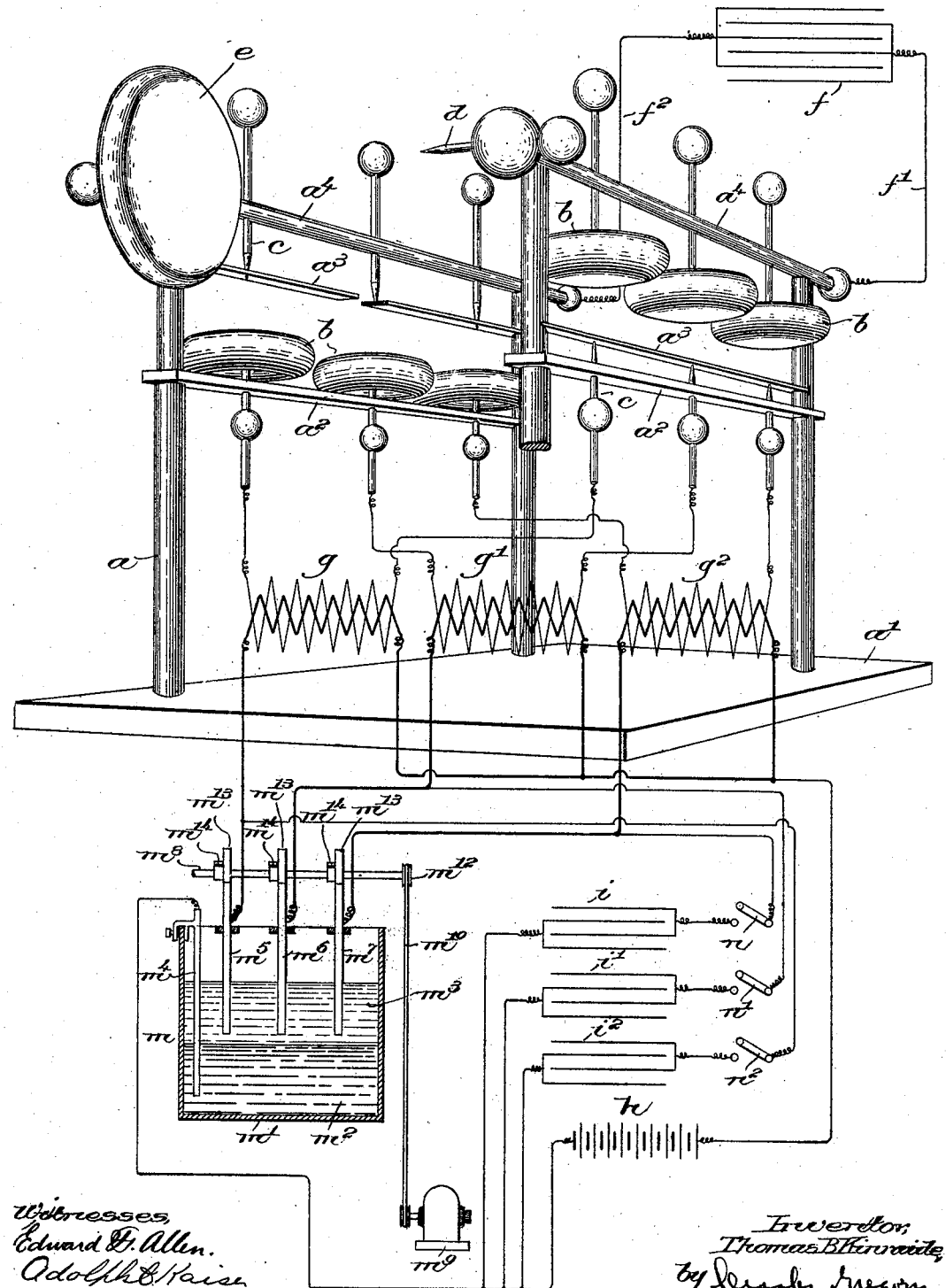

UNITED STATES PATENT OFFICE.

THOMAS B. KINRAIDE, OF BOSTON, MASSACHUSETTS.

ELECTRICAL APPARATUS.

SPECIFICATION forming part of Letters Patent No. 689,096, dated December 17, 1901.

Application filed May 4, 1901. Serial No. 58,711. (No model.)

*To all whom it may concern:*

Be it known that I, THOMAS B. KINRAIDE, a citizen of the United States, residing at Boston, county of Suffolk, State of Massachusetts, have invented an Improvement in Electrical Apparatus, of which the following description, in connection with the accompanying drawings, is a specification, like letters on the drawings representing like parts.

In my application, Serial No. 26,709, filed August 13, 1900, I have shown and described electrodes for producing unidirectional discharges; and the present invention is an electrical machine making use of these electrodes, in combination with other parts for giving a wide range of unidirectional discharge effects.

The form of apparatus which I have herein shown for the purpose of illustrating my invention is of the static rectifier type and comprises, stated in general terms, a plurality of high-potential generating units and means for uniting them for a unidirectional discharge, and a further feature thereof resides in means for getting the combined quantitative discharge effect of said units in multiple or the discharge effects thereof in succession at a given voltage, as will more fully appear in the course of the following description, reference being had to the accompanying drawings, in which I have illustrated, partly in perspective and largely diagrammatically, one embodiment of my invention.

In view of the disclosure of my before-mentioned application it will be unnecessary for me to enter into the details of operation and the reasons therefor of my point and plane electrodes.

As herein shown, I have mounted on suitable insulating-posts $a$ on a base $a'$ a series of these electrodes $b\ c$, arranged in opposite sets, there being herein shown three pairs in each set on opposite sides of the machine. On the right-hand side of the machine the point electrodes are mounted in a rail $a^2$ and screened by a shield $a^3$ (although they may be screened by any other suitable means as may be convenient, and, in fact, the machine will operate to advantage for some purposes without any screen) and the plane electrodes are mounted in a conductor-rod $a^4$, while on the opposite side of the machine the arrangement is reversed, the plane electrodes $b$ being mounted in the rail $a^2$ and the point electrodes in the rod $a^4$.

In a suitable position, herein shown as the end of the right-hand rod $a^4$, is mounted a point electrode $d$ and opposite thereto, mounted in the opposite rod $a^4$, is a plane electrode $e$, while suitably connected thereto is any form of apparatus with which it may be desired to use the machine, herein shown as a condenser $f$, connected by wires $f'\ f^2$ to the conductor-rods $a^4$.

On the base or table $a'$ are carried a plurality of "high-potential generating units," as they may be called, herein shown as usual induction-coils $g\ g'\ g^2$, the terminals of whose secondaries are connected, respectively, to the lower set of electrodes immediately above them, as is clearly shown, and whose primaries are connected to a battery or other current source $h$, an interrupter $m$ being interposed in the circuit and a series of condensers $i\ i'\ i^2$ being properly interposed. The condensers may be thrown into the circuit, as may be desired, by switches $n\ n'\ n^2$.

While the machine will work with other forms of interrupters, yet for the best efficiency thereof I have found it necessary to employ a special interrupter consisting of a cup $m'$, provided with a quantity of mercury $m^2$, above which is a bath of kerosene-oil $m^3$. A fixed conductor $m^4$ from the interrupter $m$ leads into the mercury, and above the same is arranged a series of plungers or contact-makers $m^5\ m^6\ m^7$, connecting, respectively, with the several high-potential units $g\ g'\ g^2$ and operated by a shaft $m^8$, driven by any suitable means, as by a motor $m^9$, belt $m^{10}$, and pulley $m^{12}$. On the shaft $m^8$ are eccentrics $m^{13}$, relatively adjustable by means of set-screws $m^{14}$.

I have described my mechanism in all its preferred details of construction, as herein embodied; but it will be understood that many changes and substitutions may be resorted to without departing from the spirit and scope of my invention, and that the form and general make-up of the apparatus will usually be modified to conform to the particular situation and purpose for which it is intended.

The operation is as follows: When quantitative effect of discharge is desired, the interrupter is set as shown, the eccentrics all being placed the same, so that the coils are all broken simultaneously, the coils being in multiple, and thereby the lower electrodes $c$, at the right hand, simultaneously discharge their respective coils, and this combined discharge is received by the opposite electrodes $b$ and conveyed by the conductor $a^4$, thereby giving an enormous discharge from the point $d$ to the receiving-electrode $e$, the circuit being completed therefrom through the upper electrode $c$ to the electrode $b$, and meanwhile the condenser $f$ is charged according to its capacity. If, on the other hand, continuity of discharge is desired, the eccentrics $m^{13}$ are adjusted in step with each other, so that the interruptions in the mercury-cup are made dissimultaneously or in succession, thereby discharging the coils $g$ $g'$ $g^2$ successively, and hence producing a continuous discharge between the electrodes $d$ $e$, this discharge being at a given voltage, according to the capacity of the condenser $i$ $i'$ $i^2$ or such part thereof as may be used.

By having a plurality of induction devices or high-potential generators arranged in step in connection with the point and plane electrodes I am enabled to obtain a continuous discharge, yet employ a slow interruption, the result being that a maximum output is made certain. This result has not heretofore been feasible, as it would be necessary to operate the interrupter with great rapidity in order to get the high potential required, and when the interruptions of a coil are exceedingly rapid the output from the secondary, as is well known, is below its capacity.

This invention makes possible obtaining a purely direct discharge—i. e., free from oscillations—such as has heretofore been obtained only from a static machine, accomplishes the handling or control of any quantity, however great, of high-potential current, is a most powerful generator for X-ray work and ideal in its control of the quality of X-rays on account of the discharge being wholly in one direction, continuous, and from a condenser, besides various other advantages which will occur to those skilled in the art.

I do not restrict myself to the details of construction and arrangement, excepting as expressed in the claims.

Having described my invention, what I claim as new, and desire to secure by Letters Patent, is—

1. An electrical apparatus, comprising a plurality of intermittent high-potential generating units, and means for uniting them in a unidirectional discharge.

2. An electrical apparatus, comprising a plurality of intermittent high-potential generating units, and means for uniting them in a continuous unidirectional discharge.

3. An electrical apparatus, comprising a plurality of intermittent high-potential generating units, means for giving them a unidirectional discharge, and mechanism for discharging them simultaneously or dissimultaneously, as desired.

4. An electrical apparatus, comprising a plurality of induction-coils each of whose secondaries has at one end an electrode permitting free discharge, and at the other end means for preventing free discharge, electrically-connected electrodes opposite said discharge-electrodes provided with means for readily receiving the discharge from the latter and preventing a back-discharge thereto, and a condenser and interrupter in the circuit of the primaries of said coils.

5. An electrical apparatus, comprising a plurality of induction-coils each of whose secondaries has at one end a point electrode, and at the other end a plane electrode, coöperating electrodes opposite the said electrodes of the secondaries, there being a plane electrode opposite a point electrode of a secondary and a point electrode opposite a plane electrode of a secondary, a conductor uniting said coöperating plane electrodes, and a condenser and interrupter in the circuit of the primaries of said coils.

6. An electrical apparatus, comprising a plurality of induction-coils each of whose secondaries has at one end a point electrode, and at the other end a plane electrode, coöperating electrodes opposite the said electrodes of the secondaries, there being a plane electrode opposite a point electrode of a secondary and a point electrode opposite a plane electrode of a secondary, a conductor uniting said coöperating plane electrodes, a conductor uniting said coöperating point electrodes, the former conductor having a point electrode for discharging current therefrom to the other conductor, and said other conductor having a plane electrode for receiving said current-discharge, and a condenser and interrupter in the circuit of the primaries of said coils.

7. An electrical apparatus, comprising a plurality of induction-coils whose secondaries have at one end a point electrode, and at the other end a plane electrode, coöperating electrodes therefor, and a condenser and interrupter in the circuit of the primaries of said coils, said interrupter comprising a mercury-cup having a series of movable contact-makers movable in oil above said mercury.

8. An electrical apparatus, comprising a plurality of induction-coils whose secondaries have at one end a point electrode, and at the other end a plane electrode, coöperating electrodes therefor, a condenser and interrupter in the circuit of the primaries of said coils, said interrupter comprising a mercury-cup having a series of movable contact-makers movable in oil above said mercury, and means for varying the movement of said contact-makers with relation to each other.

9. An electrical apparatus, comprising a plurality of induction-coils whose secondaries have at one end a point electrode, and at the other end a plane electrode, coöperating electrodes therefor, a condenser and interrupter in the circuit of the primaries of said coils, said interrupter comprising a mercury-cup having a series of movable contact-makers movable in oil above said mercury, said condenser having a plurality of independent parts, and switching mechanism for throwing said parts independently into the circuit of said primaries.

In testimony whereof I have signed my name to this specification in the presence of two subscribing witnesses.

THOMAS B. KINRAIDE.

Witnesses:
   GEO. H. MAXWELL,
   WILHELMINA C. HEUSER.